(12) United States Patent
Houston et al.

(10) Patent No.: US 7,105,772 B2
(45) Date of Patent: Sep. 12, 2006

(54) ARC WELDING SYSTEM AND METHOD

(75) Inventors: William S. Houston, Avon, OH (US);
Russell K. Myers, Hudson, OH (US);
Timothy P. Rosiek, Mentor, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 450 days.

(21) Appl. No.: 10/394,014

(22) Filed: Mar. 24, 2003

(65) Prior Publication Data
US 2004/0232129 A1    Nov. 25, 2004

(51) Int. Cl.
*B23K 9/09* (2006.01)
(52) U.S. Cl. .................................. 219/130.51
(58) Field of Classification Search ........... 219/130.21, 219/130.51, 130.31, 130.32, 130.33
See application file for complete search history.

(56) References Cited

U.S. PATENT DOCUMENTS

| 4,092,517 | A | * | 5/1978 | Woodacre | ............... | 219/130.21 |
|---|---|---|---|---|---|---|
| 4,485,293 | A | | 11/1984 | Tabata et al. | | |
| 4,697,062 | A | * | 9/1987 | Awano et al. | .......... | 219/130.51 |
| 4,877,941 | A | * | 10/1989 | Honma et al. | ......... | 219/130.21 |
| 5,278,390 | A | | 1/1994 | Blankenship | | |
| 6,111,216 | A | | 8/2000 | Stava | | |
| 6,207,929 | B1 | | 3/2001 | Stava | | |
| 6,291,798 | B1 | | 9/2001 | Stava | | |
| 6,472,634 | B1 | | 10/2002 | Houston | | |

FOREIGN PATENT DOCUMENTS

| DE | 2658724 A1 * | 6/1978 |
|---|---|---|
| EP | 1063044 A | 12/2000 |
| JP | 09108836 A | 4/1997 |
| JP | 10328827 A | 12/1998 |

OTHER PUBLICATIONS

European Search Report, Application No. EP 04 00 0936, Dated Mar. 23, 2005, Examiner H. Jaeger.

* cited by examiner

*Primary Examiner*—Clifford C. Shaw
(74) *Attorney, Agent, or Firm*—Fay, Sharpe, Fagan, Minnich & McKee, LLP

(57) ABSTRACT

A welder using a circuit or method of changing polarity of an AC welding current comprising: the generation of a polarity changing signal, commanding a change in the polarity of the current a given time after generation of the polarity changing signal and reducing the given time upon detection of a short in the welding current.

61 Claims, 10 Drawing Sheets

ARC WELDING SYSTEM AND METHOD

The present invention relates to the art of electric arc welding and more particularly to an electric arc welding system to operate tandem electrodes by AC current and a method of controlling the reverse polarity pulses of the current.

INCORPORATION BY REFERENCE

The present invention is directed to an electric arc welding system utilizing high capacity alternating circuit power supplies for driving two or more tandem electrodes of the type used in seam welding of large metal blanks. Although the invention can be used with any standard AC power supply with switches for changing the output polarity, it is preferred that the power supplies use the switching concept disclosed in Stava U.S. Pat. No. 6,111,216 wherein the power supply is an inverter having two large output polarity switches with the arc current being reduced before the switches reverse the polarity. Consequently, the term "switching point" is a complex procedure whereby the power supply is first turned off awaiting a current less than a preselected value, such as 100 amperes. Upon reaching the 100 ampere threshold, the output switches of the power supply are reversed to reverse the polarity from the D.C. output link of the inverter. Thus, the "switching point" is an off output command, known as a "kill" command, to the power supply inverter followed by a switching command to reverse the output polarity. The kill output can be a drop to a decreased current level. This procedure is duplicated at each successive polarity reversal so the AC power supply reverses polarity only at a low current. In this manner, snubbing circuits for the output polarity controlling switches are reduced in size or eliminated. Since this switching concept is preferred to define the switching points as used in the present invention, Stava U.S. Pat. No. 6,111,216 is incorporated by reference. The concept of an AC current for tandem electrodes is well known in the art. U.S. Pat. No. 6,207,929 discloses a system whereby tandem electrodes are each powered by a separate inverter type power supply. The frequency is varied to reduce the interference between alternating current in the adjacent tandem electrodes. Indeed, this prior patent of assignee relates to single power sources for driving either a DC powered electrode followed by an AC electrode or two or more AC driven electrodes. In each instance, a separate inverter type power supply is used for each electrode and, in the alternating current high capacity power supplies, the switching point concept of Stava U.S. Pat. No. 6,111,216 is employed. This system for separately driving each of the tandem electrodes by a separate high capacity power supply is background information to the present invention and is incorporated herein as such background. In a like manner, U.S. Pat. No. 6,291,798 discloses a further arc welding system wherein each electrode in a tandem welding operation is driven by two or more independent power supplies connected in parallel with a single electrode arc. The system involves a single set of switches having two or more accurately balanced power supplies forming the input to the polarity reversing switch network operated in accordance with Stava U.S. Pat. No. 6,111,216. Each of the power supplies is driven by a single command signal and, therefore, shares the identical current value combined and directed through the polarity reversing switches. This type system requires large polarity reversing switches since all of the current to the electrode is passed through a single set of switches. U.S. Pat. No. 6,291,798 does show a master and slave combination of power supplies for a single electrode and discloses general background information to which the invention is directed. For that reason, this patent is also incorporated by reference. An improvement for operating tandem electrodes with controlled switching points is disclosed in Houston U.S. Pat. No. 6,472,634. This patent is incorporated by reference.

BACKGROUND OF INVENTION

Welding applications, such as pipe welding, often require high currents and use several arcs created by tandem electrodes. Such welding systems are quite prone to certain inconsistencies caused by arc disturbances due to magnetic interaction between two adjacent tandem electrodes. A system for correcting the disadvantages caused by adjacent AC driven tandem electrodes is disclosed in Stava U.S. Pat. No. 6,207,929. In that prior patent, each of the AC driven electrodes has its own inverter based power supply. The output frequency of each power supply is varied so as to prevent interference between adjacent electrodes. This system requires a separate power supply for each electrode. As the current demand for a given electrode exceeds the current rating of the inverter based power supply, a new power supply must be designed, engineered and manufactured. Thus, such system for operating tandem welding electrodes require high capacity or high rated power supplies to obtain high current as required for pipe welding. To decrease the need for special high current rated power supplies for tandem operated electrodes, assignee developed the system disclosed in Stava U.S. Pat. No. 6,291,798 wherein each AC electrode is driven by two or more inverter power supplies connected in parallel. These parallel power supplies have their output current combined at the input side of a polarity switching network. Thus, as higher currents are required for a given electrode, two or more parallel power supplies are used. In this system, each of the power supplies are operated in unison and share equally the output current. Thus, the current required by changes in the welding conditions can be provided only by the over current rating of a single unit. A current balanced system did allow for the combination of several smaller power supplies; however, the power supplies had to be connected in parallel on the input side of the polarity reversing switching network. As such, large switches were required for each electrode. Consequently, such system overcame the disadvantage of requiring special power supplies for each electrode in a tandem welding operation of the type used in pipe welding; but, there is still the disadvantage that the switches must be quite large and the input, paralleled power supplies must be accurately matched by being driven from a single current command signal. Stava U.S. Pat. No. 6,291,798 does utilize the concept of a synchronizing signal for each welding cell directing current to each tandem electrode. However, the system still required large switches. This type of system was available for operation in an ethernet network interconnecting the welding cells. In ethernet interconnections, the timing cannot be accurately controlled. In the system described, the switch timing for a given electrode need only be shifted on a time basis, but need not be accurately identified for a specific time. Thus, the described system requiring balancing the current and a single switch network has been the manner of obtaining high capacity current for use in tandem arc welding operations when using an ethernet network or an internet and ethernet control system. There is a desire to control welders by an ethernet network, with or without an internet link. Due to timing limitation, these networks dictated use of tandem electrode systems of the type using only general synchronizing techniques.

Such systems could be controlled by a network; however, the parameter to each paralleled power supply could not be varied. Each of the cells could only be offset from each other by a synchronizing signal. Such systems were not suitable for central control by the internet and/or local area network control because an elaborate network to merely provide offset between cells was not advantageous. Houston U.S. Pat. No. 6,472,634 discloses the concept of a single AC arc welding cell for each electrode wherein the cell itself includes one or more paralleled power supplies each of which has its own switching network. The output of the switching network is then combined to drive the electrode. This allows the use of relatively small switches for polarity reversing of the individual power supplies paralleled in the system. In addition, relatively small power supplies can be paralleled to build a high current input to each of several electrodes used in a tandem welding operation. The use of several independently controlled power supplies paralleled after the polarity switch network for driving a single electrode allows advantageous use of a network, such as the internet or ethernet.

In Houston U.S. Pat. No. 6,472,634, smaller power supplies in each system are connected in parallel to power a single electrode. By coordinating switching points of each paralleled power supply with a high accuracy interface, the AC output current is the sum of currents from the paralleled power supplies without combination before the polarity switches. By using this concept, the ethernet network, with or without an internet link, can control the weld parameters of each paralleled power supply of the welding system. The timing of the switch points is accurately controlled by the novel interface, whereas the weld parameters directed to the controller for each power supply can be provided by an ethernet network which has no accurate time basis. Thus, an internet link can be used to direct parameters to the individual power supply controllers of the welding system for driving a single electrode. There is no need for a time based accuracy of these weld parameters coded for each power supply. In the preferred implementation, the switch point is a "kill" command awaiting detection of a current drop below a minimum threshold, such as 100 amperes. When each power supply has a switch command, then they switch. The switch points between parallel power supplies, whether instantaneous or a sequence involving a "kill" command with a wait delay, are coordinated accurately by an interface card having an accuracy of less than 10 μs and preferably in the range of 1–5 μs. This timing accuracy coordinates and matches the switching operation in the paralleled power supplies to coordinate the AC output current.

By using the internet or ethernet local area network, the set of weld parameters for each power supply is available on a less accurate information network, to which the controllers for the paralleled power supplies are interconnected with a high accuracy digital interface card. Thus, the switching of the individual, paralleled power supplies of the system is coordinated. This is an advantage allowing use of the internet and local area network control of a welding system. The information network includes synchronizing signals for initiating several arc welding systems connected to several electrodes in a tandem welding operation in a selected phase relationship. Each of the welding systems of an electrode has individual switch points accurately controlled while the systems are shifted or delayed to prevent magnetic interference between different electrodes. This allows driving of several AC electrodes using a common information network.

The Houston U.S. Pat. No. 6,472,634 system is especially useful for paralleled power supplies to power a given electrode with AC current. The switch points are coordinated by an accurate interface and the weld parameter for each paralleled power supply is provided by the general information network. This background is technology developed and patented by assignee and does not necessarily constitute prior art just because it is herein used as "background."

As a feature of the system in Stava U.S. Pat. No. 6,207,929, two or more power supplies can drive a single electrode. Thus, the system comprises a first controller for a first power supply to cause the first power supply to create an AC current between the electrode and workpiece by generating a switch signal with polarity reversing switching points in general timed relationship with respect to a given system synchronizing signal received by the first controller. This first controller is operated at first welding parameters in response to a set of first power supply specific parameter signals directed to the first controller. There is provided at least one slave controller for operating the slave power supply to create an AC current between the same electrode and workpiece by reversing polarity of the AC current at switching points. The slave controller operates at second weld parameters in response to the second set of power supply specific parameter signals to the slave controller. An information network connected to the first controller and the second or slave controller contains digital first and second power supply specific parameter signals for the two controllers and the system specific synchronizing signal. Thus, the controllers receive the parameter signals and the synchronizing signal from the information network, which may be an ethernet network with or without an internet link, or merely a local area network. The invention involves a digital interface connecting the first controller and the slave controller to control the switching points of the second or slave power supply by the switch signal from the first or master controller. In practice, the first controller starts a current reversal at a switch point. This event is transmitted at high accuracy to the slave controller to start its current reversal process. When each controller senses an arc current less than a given number, a "ready signal" is created. After a "ready" signal from all paralleled power supplies, all power supplies reverse polarity. This occurs upon receipt of a strobe or look command each 25 μs. Thus, the switching is in unison and has a delay of less than 25 μs. Consequently, both of the controllers have interconnected data controlling the switching points of the AC current to the single electrode. The same controllers receive parameter information and a synchronizing signal from an information network which in practice comprises a combination of internet and ethernet or a local area ethernet network. The timing accuracy of the digital interface is less than about 10 μs and, preferably, in the general range of 1–5 μs. Thus, the switching points for the two controllers driving a single electrode are commanded within less than 5 μs. Then, switching actually occurs within 25 μs. At the same time, relatively less time sensitive information is received from the information network also connected to the two controllers driving the AC current to a single electrode in a tandem welding operation. The 25 μs maximum delay can be changed, but is less than the switch command accuracy.

The unique control system disclosed in Houston U.S. Pat. No. 6,472,634 is used to control the power supply for tandem electrodes used primarily in pipe seam welding and disclosed in Stava U.S. Pat. No. 6,291,798. This Stava patent relates to a series of tandem electrodes movable along a welding path to lay successive welding beads in the space between the edges of a rolled pipe or the ends of two adjacent pipe sections. The individual AC waveforms used in this unique technology are created by a number of current pulses occurring at a frequency of at least 18 kHz with a magnitude of each current pulse controlled by a wave shaper. This technology dates back to Blankenship U.S. Pat. No. 5,278,390. Shaping of the waveforms in the AC currents of two adjacent tandem electrodes is known and is shown in not only the patents mentioned above, but in Stava U.S. Pat. No. 6,207,929. In this latter Stava patent, the frequency of the AC current at adjacent tandem electrodes is adjusted to prevent magnetic interference. All of these patented technologies by The Lincoln Electric Company of Cleveland, Ohio have been advances in the operation of tandem electrodes each of which is operated by a separate AC waveform created by the waveform technology set forth in these patents. These patents are incorporated by reference herein. However, these patents do not disclose the present invention which is directed to a waveform technology type welder that overcomes a disadvantage resulting in the use of the several patents incorporated by reference herein. In these patents, the AC current of adjacent tandem electrodes are provided with offset current pulses as determined by the offset of the synchronizing signals from the pulse generator used to initiate changes in polarity. These prior systems shift the phase of the AC current arc at the trailing electrode in an effort to maintain a preselected phase shift from the current at the leading electrode. However, due to the inductance of the welding system, including the cables and internal components, a short circuit at one of the electrodes caused the phase shift to be enlarged or contracted. When this occurred, prolonged like polarity or opposite polarity between adjacent tandem electrodes would exist. This caused either cavitation or building up of molten metal between the electrodes. The weld puddle was disturbed. Consequently, using the waveform technology and the inventions of the various patents incorporated by reference herein experienced a slight problem created by short circuiting of one of the AC driven tandem electrodes. The present invention relates to an apparatus, method and system for overcoming this technical phenomena to enhance the uniformity and weld efficiency while using the waveform technology described in the several patents of Lincoln Electric.

THE INVENTION

The present invention relates to an apparatus, method and system to maintain the desired phase shift between the pulses of AC current used in adjacent tandem electrodes even though one of the electrodes becomes shorted temporarily. In accordance with the invention, there is provided an electric arc welding apparatus of the type comprising at least a first consumable electrode and a second consumable electrode movable in unison along a welding path on a workpiece. A first power source is used for passing a first current with alternate positive and negative pulses between the first electrode and the workpiece and a second power source is used for passing a second current with alternate positive and negative pulses between the second electrode and the workpiece. In accordance with standard technology, there is provided a first circuit to generate a first series of polarity changing signals for the first current and a second circuit for generating a second series of polarity changing signals for the second current. As is also known, there is a circuit to create a polarity changing command signal in response to each of the polarity changing signals. Each of these command signals cause a change in the polarity of the AC current only when the current commanded to change polarity decreases to a set value, usually 100 amperes. This is the concept taught by Stava U.S. Pat. No. 6,111,216. The present invention is directed to the use in this technology of a circuit to delay creation of the polarity changing command signal after the generated polarity changing signal that causes the command signal. In other words, the standard polarity changing signal for the AC current of both electrodes operates in accordance with the command signal 502 shown in FIG. 8 of Hudson U.S. Pat. No. 6,472,634. In this prior patent, the commanded signal initiates the process used to change polarity. This change in polarity does not occur until the inverter output current decreases to a level, such as 100 amperes. However, the command signal does initiate the actual process to change polarity when a polarity change signal is created from the synchronizing pulse generator. The only delay between the change signal and the command signal used to switch polarity is the mere result of coordinating several parallel connected power sources. In that instance, the actual change in polarity of the AC current awaits the decrease of current from all power supplies to the preset level such as 100 amperes. In this prior art, the command signal essentially operates in accordance with creation of the polarity changing signal. This is especially true when there is only one power source for each tandem electrode. In accordance with the present invention, there is a provided a circuit to delay creation of the command signal after generation of the polarity changing signal that causes the command signal. This delay is a fixed figure of less than 3.0 ms and is used to compensate for short circuit conditions at one of the tandem electrodes. When there is a short circuit of one electrode, the time constant for the decrease in current to the fixed level, such as 100 amperes, is drastically increased. This is because the time constant is determined by the inductance divided by the resistance. The inductance remains essentially the same while the resistance plunges where there is a short. Thus, the time constant that controls the time for the current to reach the switching value set generally at about 100 amperes is drastically increased when there is a short. In accordance with the present invention, this short condition at an electrode is detected, preferably by a voltage detector. This voltage detector then decreases or removes the time delay built into the welding apparatus, method and system of the present invention. Consequently, by incorporating a time delay between the creation of the polarity changing signal and the actual command signal, a short circuit can be used to remove this delay. This shifts the current pulse of the shorted electrode to the left thereby bringing it into phase relationship with the current pulse of the adjacent tandem electrode. Thus, the present invention involves an intentional fixed time delay between the polarity changing signal and the command signal of the welding technology disclosed in the prior Lincoln Electric patents. Then, a detection of a short removes or reduces the time delay thereby shifting the distorted positive or negative current pulse to the left and back into the desired phase relationship, or close thereto.

In accordance with another aspect of the present invention, the polarity changing signals are created by the leading and trailing edges of a pulse from a synchronizing pulse generator. This pulse generator is disclosed in the prior patents whereby the pulses for the first arc are offset from the pulses of the second arc to establish a desired phase shift. The present invention maintains this desired phase shift even when one of the electrodes is inadvertently shorted.

In accordance with another aspect of the present invention, when a short is detected at one of the electrodes, the next switching sequence is offset to the left on the timing graph. This conforms the next pulse to the desired phase shift created by the synchronizing pulse generator.

In accordance with still a further aspect of the present invention there is provided a method of changing polarity of the welding current in an electric arc welder. This method comprises generating a polarity changing signal, commanding a change in the polarity of the current a given time after generation of the polarity changing signal and reducing this given time upon detection of a short in the welding current. In a like manner, there is provided a system to change polarity of the welding current in an electric arc welder wherein the system includes a first circuit to generate a polarity changing signal, a second circuit to command change in the polarity of the current a given time after the generation of the polarity changing signal and a circuit to reduce the given time upon detection of a short in the welding circuit. The reduction of the given time is preferably to zero.

Still a further aspect of the invention is the provision of a system, apparatus and method as disclosed above, wherein the AC current is formed by a large number of small individual current pulses from a pulse width modulator and having a profile controlled by a wave shaper. This is waveform technology as disclosed in the several patents incorporated by reference herein.

The primary object of the present invention is the provision of a welding apparatus of the type disclosed in Houston U.S. Pat. No. 6,472,634 wherein a short of one of the tandem operated electrodes does not drastically change the desired phase shift of the AC currents of the electrodes.

Still a further object of the present invention is the provision of an apparatus, as defined above, which apparatus utilizes a voltage detector and a time delay circuit between creation of the polarity changing signal and the polarity command signal so that this delay can be reduced or eliminated upon detection of a short.

Still a further object of the present invention is the provision of a method and system for changing the polarity of a welding current in an electric arc welder, which method and system compensates for unwanted phase shifting of the AC currents in adjacent electrodes when there is a short of an electrode.

These and other objects and advantages will become apparent from the following description taken together with the accompanying drawings.

PREFERRED EMBODIMENT

Figure 1:
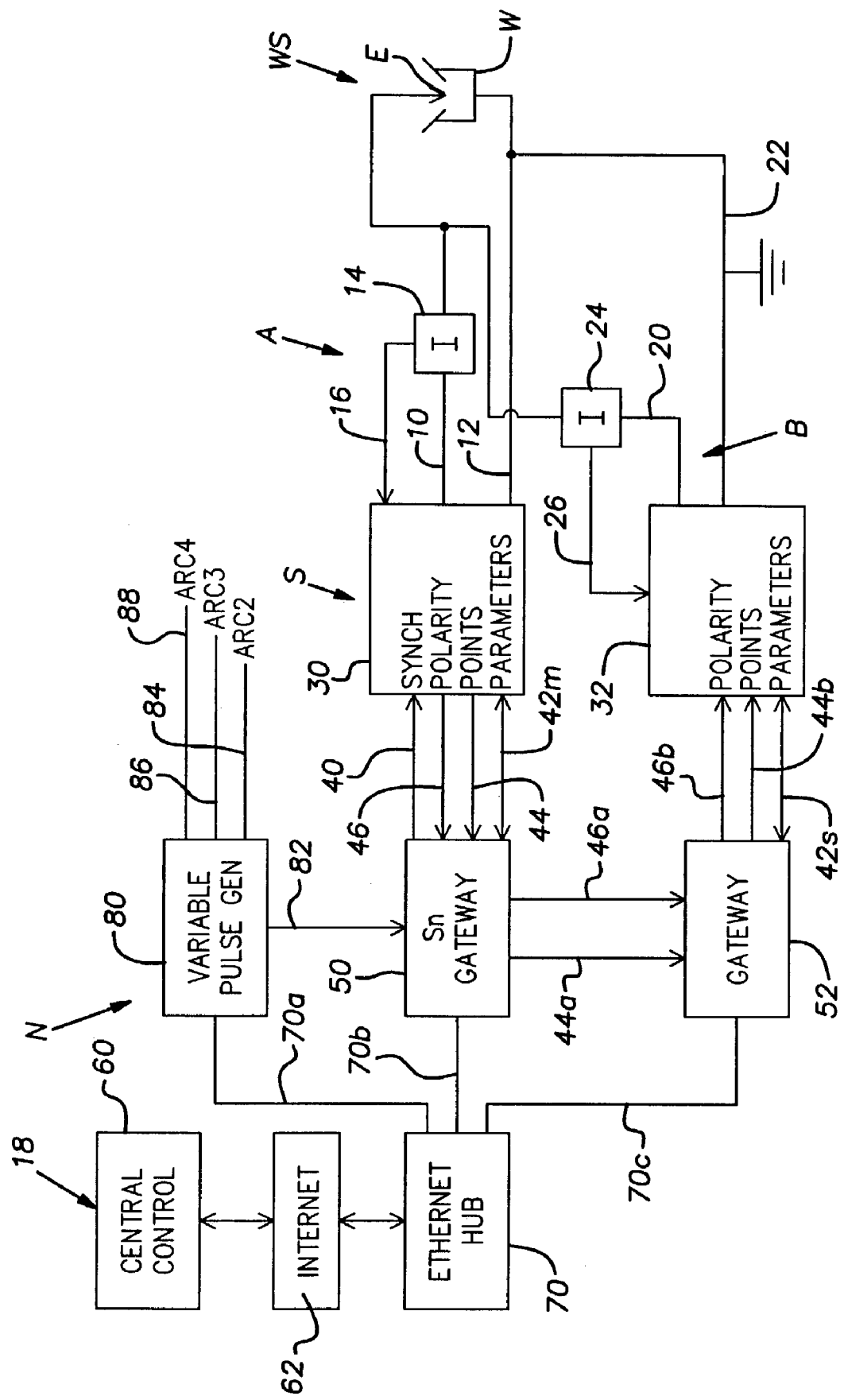
FIG. 1 is a block diagram of the preferred welder for use of the present invention.
Figure 2:
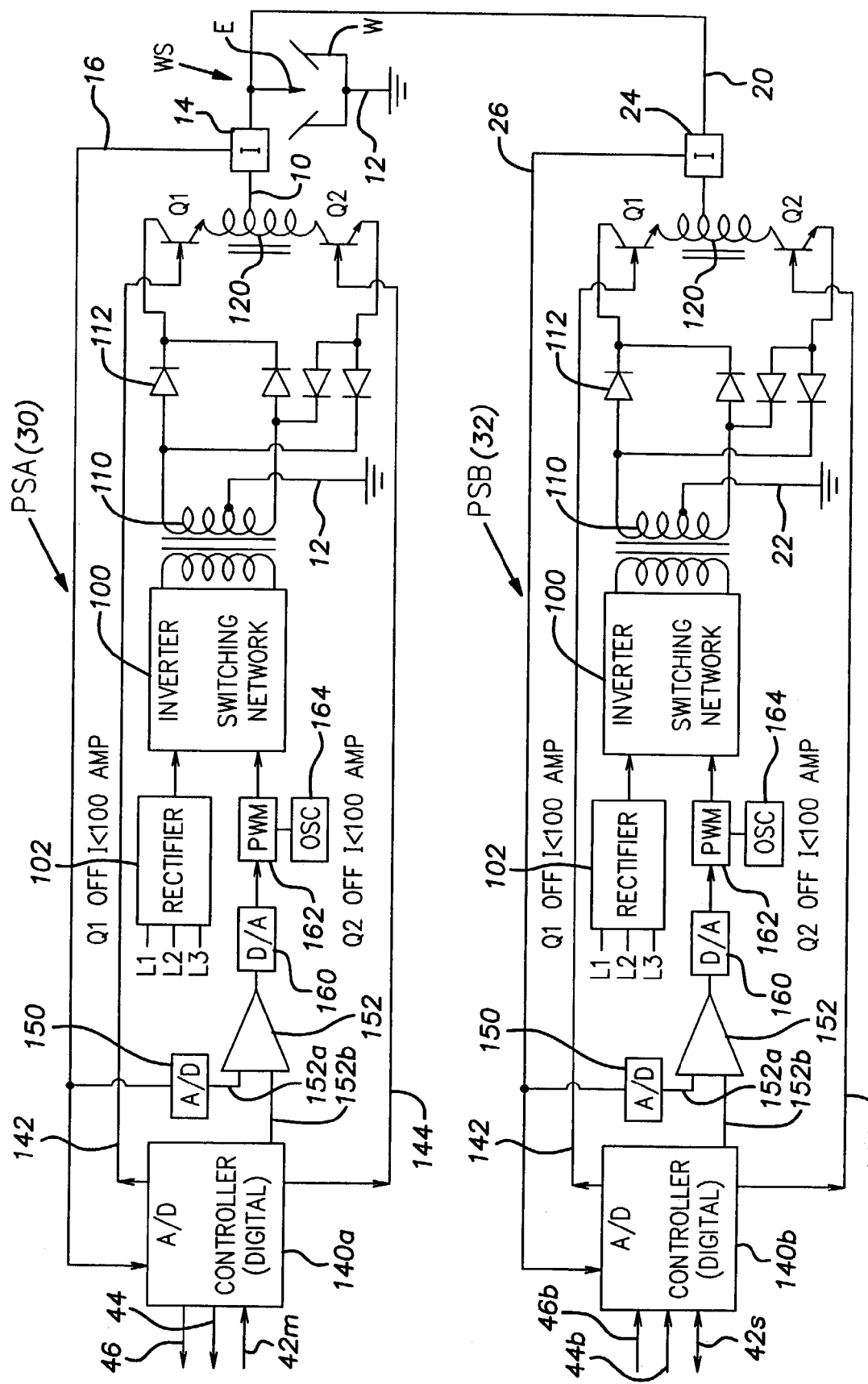
FIG. 2 is a wiring diagram of two paralleled power supplies, each of which include a switching output which power supplies are used in practicing the invention.
Figure 5:
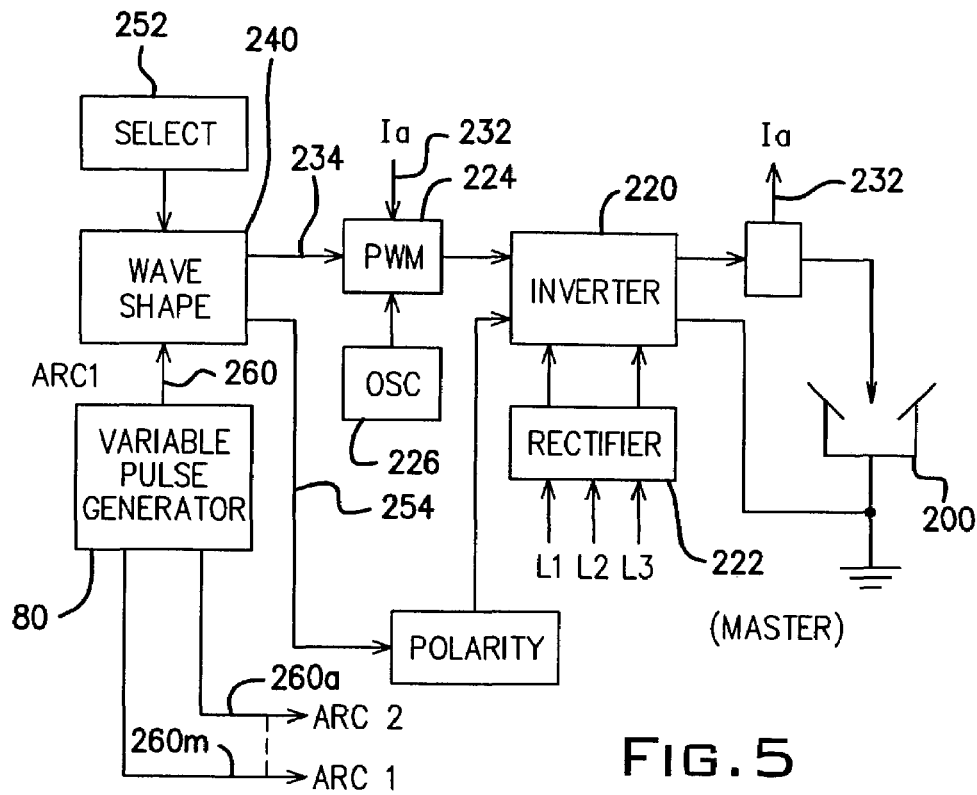
FIG. 5 is a block diagram showing a single electrode driven by the system as shown in FIG. 4 with a variable pulse generator disclosed in Houston U.S. Pat. No. 6,472,634.
Figure 12:
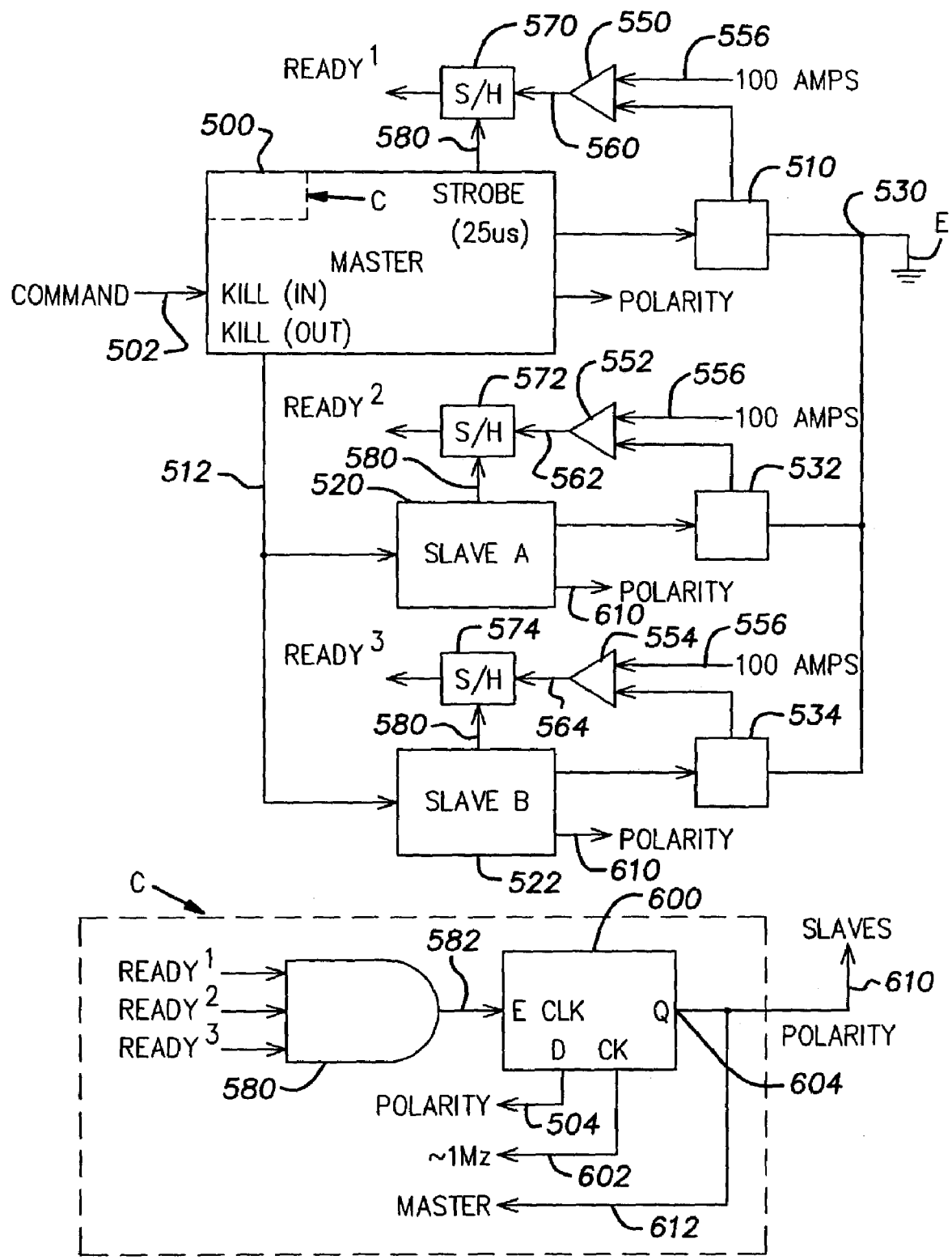

Referring now to the drawings wherein the showings are for the purpose of illustrating a preferred embodiment of the invention only and not for the purpose of limiting same, the system for implementing the invention is shown in detail in FIGS. 1, 2 AND 12. In FIG. 1 there is a single electric arc welding system S in the form of a single cell to create an alternating current as an arc at weld station WS. This system or cell includes a first master welder A with output leads 10, 12 in series with electrode E and workpiece W in the form of a pipe seam joint or other welding operation. Hall effect current transducer 14 provides a voltage in line 16 proportional to the current of welder A. Less time critical data, such as welding parameters, are generated at a remote central control 18. In a like manner, a slave following welder B includes leads 20, 22 connected in parallel with leads 10, 12 to direct an additional AC current to the weld station WS. Hall effect current transducer 24 creates a voltage in line 26 representing current levels in welder B during the welding operation. Even though a single slave or follower welder B is shown, any number of additional welders can be connected in parallel with master welder A to produce an alternating current across electrode E and workpiece W. The AC current is combined at the weld station instead of prior to a polarity switching network. Each welder includes a controller and inverter based power supply illustrated as a combined master controller and power supply 30 and a slave controller and power supply 32. Controllers 30, 32 receive parameter data and synchronization data from a relatively low level logic network. The parameter information or data is power supply specific whereby each of the power supplies is provided with the desired parameters such as current, voltage and/or wire feed speed. A low level digital network can provide the parameter information; however, the AC current for polarity reversal occurs at the same time. The "same" time indicates a time difference of less than 10 μs and preferably in the general range of 1–5 μs. To accomplish precise coordination of the AC output from power supply 30 and power supply 32, the switching points and polarity information can not be provided from a general logic network wherein the timing is less precise. The individual AC power supplies are coordinated by high speed, highly accurate DC logic interface referred to as "gateways." As shown in FIG. 1, power supplies 30, 32 are provided with the necessary operating parameters indicated by the bi-directional leads 42m, 42s, respectively. This non-time sensitive information is provided by a digital network shown in FIG. 1. Master power supply 30 receives a synchronizing signal as indicated by unidirectional line 40 to time the controllers operation of its AC output current. The polarity of the AC current for power supply 30 is outputted as indicated by line 46. The actual switching command for the AC current of master power supply 30 is outputted on line 44. The switch command tells power supply S, in the form of an inverter, to "kill," which is a drastic reduction of current. In an alternative, this is actually a switch signal to reverse polarity. The "switching points" or command on line 44 preferably is a "kill" and current reversal commands utilizing the "switching points" as set forth in Stava U.S. Pat. No. 6,111,216. Thus, timed switching points or commands are outputted from power supply 30 by line 44. These switching points or commands may involve a power supply "kill" followed by a switch ready signal at a low current or merely a current reversal point. The switch "ready" is used when the "kill" concept is implemented because neither inverters are to actually reverse until they are below the set current. This is described in FIG. 12. The polarity of the switches of controller 30 controls the logic on line 46. Slave power supply 32 receives the switching point or command logic on line 44b and the polarity logic on line 46b. These two logic signals are interconnected between the master power supply and the slave power supply through the highly accurate logic interface shown as gateway 50, the transmitting gateway, and gateway 52, the receiving gateway. These gateways are network interface cards for each of the power supplies so that the logic on lines 44b, 46b are timed closely to the logic on lines 44, 46, respectively. In practice, network interface cards or gateways 50, 52 control this logic to within 10 μs and preferably within 1–5 μs. A low accuracy network controls the individual power supplies for data from central control 18 through lines 42m, 42s, illustrated as provided by the gateways or interface cards. These lines contain data from remote areas (such as central control 18) which are not time sensitive and do not use the accuracy characteristics of the gateways. The highly accurate data for timing the switch reversal uses interconnecting logic signals through network interface cards 50, 52. The system in FIG. 1 is a single cell for a single AC arc; however, the invention is directed to tandem electrodes wherein two or more AC arcs are created to fill the large gap found in pipe welding. Thus, the master power supply 30 for the first electrode receives a synchronization signal which determines the timing or phase operation of the system S for a first electrode, i.e. ARC 1. System S is used with other identical systems to generate ARCs 2, 3, and 4 timed by synchronizing outputs 84, 86 and 88. This concept is schematically illustrated in FIG. 5. The synchronizing or phase setting signals 82–88 are shown in FIG. 1 with only one of the tandem electrodes. An information network N comprising a central control computer and/or web server 60 provides digital information or data relating to specific power supplies in several systems or cells controlling different electrodes in a tandem operation. Internet information is directed to a local area network in the form of an ethernet network 70 having local interconnecting lines 70a, 70b, 70c. Similar interconnecting lines are directed to each power supply used in the four cells creating ARCs 1, 2, 3 and 4 of a tandem welding operation. The description of system or cell S applies to each of the arcs at the other electrodes. If AC current is employed, a master power supply is used. In some instances, merely a master power supply is used with a cell specific synchronizing signal. If higher currents are required, the systems or cells include a master and slave power supply combination as described with respect to system S of FIG. 1. In some instances, a DC arc is used with two or more AC arcs synchronized by generator 80. Often the DC arc is the leading electrode in a tandem electrode welding operation, followed by two or more synchronized AC arcs. A DC power supply need not be synchronized, nor is there a need for accurate interconnection of the polarity logic and switching points or commands. Some DC powered electrodes may be switched between positive and negative, but not at the frequency of an AC driven electrode. Irrespective of the make-up of the arcs, ethernet or local area network 70 includes the parameter information identified in a coded fashion designated for specific power supplies of the various systems used in the tandem welding operation. This network also employs synchronizing signals for the several cells or systems whereby the systems can be offset in a time relationship. These synchronizing signals are decoded and received by a master power supply as indicated by line 40 in FIG. 1. In this manner, the AC arcs are offset on a time basis. These synchronizing signals are not required to be as accurate as the switching points through network interface cards or gateways 50, 52. Synchronizing signals on the data network are received by a network interface in the form of a variable pulse generator 80. The generator creates offset synchronizing signals in lines 84, 86 and 88. These synchronizing signals dictate the phase of the individual alternating current cells for separate electrodes in the tandem operation. Synchronizing signals can be generated by interface 80 or actually received by the generator through the network 70. In practice, network 70 merely activates generator 80 to create the delay pattern for the many synchronizing signals. Also, generator 80 can vary the frequency of the individual cells by frequency of the synchronizing pulses if that feature is desired in the tandem welding operation.

A variety of controllers and power supplies could be used for practicing the system as described in FIG. 1; however, preferred implementation of the system is set forth in FIG. 2 wherein power supply PSA is combined with controller and power supply 30 and power supply PSB is combined with controller and power supply 32. These two units are essentially the same in structure and are labeled with the same numbers when appropriate. Description of power supply PSA applies equally to power supply PSB. Inverter 100 has an input rectifier 102 for receiving three phase line current L1, L2, and L3. Output transformer 110 is connected through an output rectifier 112 to tapped inductor 120 for driving opposite polarity switches Q1, Q2. Controller 140a of power supply PSA and controller 140b of PSB are essentially the same, except controller 140a outputs timing information to controller 140b. Switching points or lines 142, 144 control the conductive condition of polarity switches Q1, Q2 for reversing polarity at the time indicated by the logic on lines 142, 144, as explained in more detail in Stava U.S. Pat. No. 6,111,216 incorporated by reference herein. The control is digital with a logic processor; thus, A/D converter 150 converts the current information on feedback line 16 or line 26 to controlling digital values for the level of output from error amplifier 152 which is illustrated as an analog error amplifier. In practice, this is a digital system and there is no further analog signal in the control architecture. As illustrated, however, amplifier has a first input 152a from converter 150 and a second input 152b from controller 140a or 140b. The current command signal on line 152b includes the wave shape or waveform required for the AC current across the arc at weld station WS. This is standard practice as taught by several patents of Lincoln Electric, such as Blankenship U.S. Pat. No. 5,278,390, incorporated by reference. See also Stava U.S. Pat. No. 6,207,929, incorporated by reference. The output from amplifier 152 is converted to an analog voltage signal by converter 160 to drive pulse width modulator 162 at a frequency controlled by oscillator 164, which is a timer program in the processor software. The shape of the waveform at the arcs is the voltage or digital number at lines 152*b*. The frequency of oscillator 164 is greater than 18 kHz. The total architecture of this system is digitized in the preferred embodiment of the present invention and does not include reconversion back into analog signal. This representation is schematic for illustrative purposes and is not intended to be limiting of the type of power supply used in practicing the present invention. Other power supplies could be employed.

Figure 3:
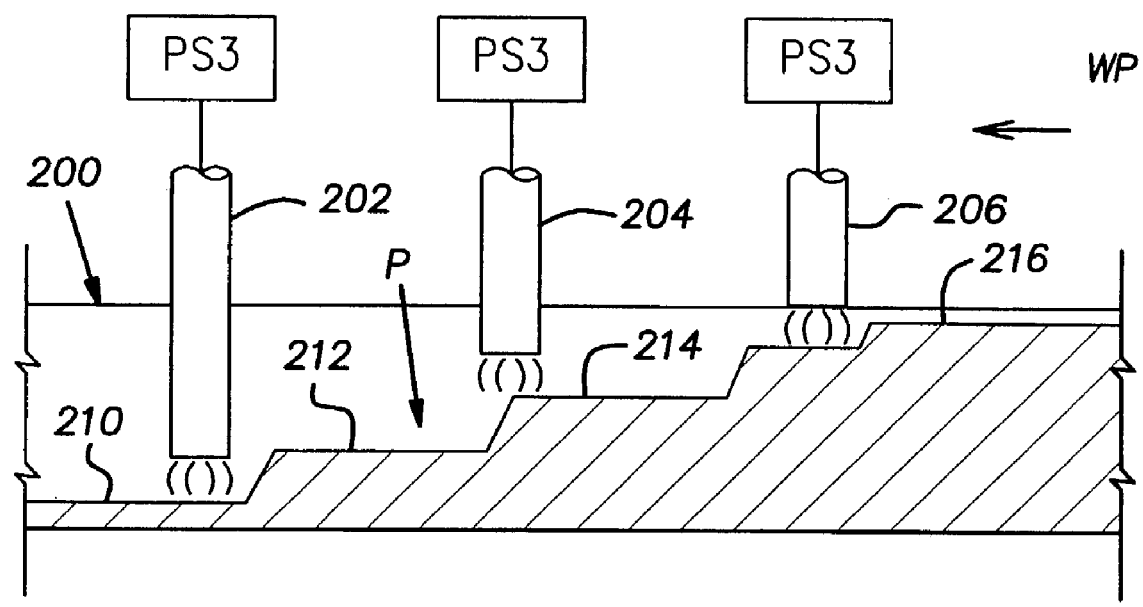
FIG. 3 is a cross sectional side view of three tandem electrodes operated in accordance with the present invention for welding the seam of a pipe.
Figure 4:
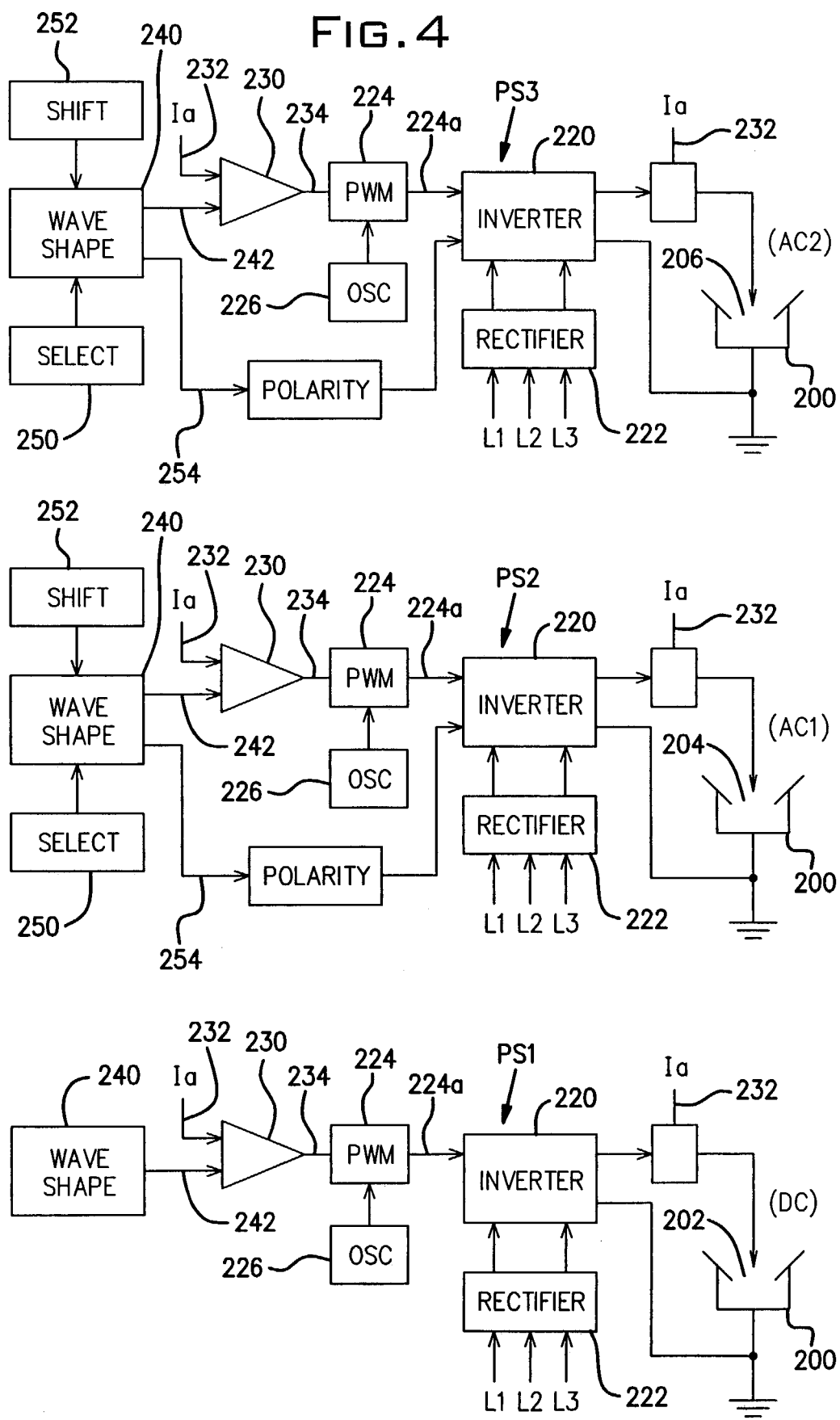
FIG. 4 is a schematic layout in block form of a welding system for three electrodes using the disclosure in Houston U.S. Pat. No. 6,472,634 and Stava U.S. Pat. No. 6,291,798.

The practice of the present invention utilizing the concepts of FIGS. 1 and 2 are illustrated in FIGS. 3 and 4. Workpiece 200 is a seam in a pipe which is welded together by tandem electrodes 202, 204 and 206 powered by individual power supplies PS1, PS2, PS3, respectively. The power supplies can include more than one power source coordinated in accordance with the technology in Houston U.S. Pat. No. 6,472,634. The illustrated embodiment involves a DC arc for lead electrode 202 and an AC arc for each of the tandem electrodes 204, 206. The created waveforms of the tandem electrodes are AC currents and include shapes created by a wave shaper or wave generator in accordance with the previously described waveform technology. As electrodes 202, 204 and 206 are moved along weld path WP a molten metal puddle P is deposited in pipe seam 200 with an open root portion 210 followed by deposits 212, 214 and 216 from electrodes 202, 204 and 206, respectively. As previously described more than two AC driven electrodes can be operated by the invention relating to AC currents of adjacent electrodes. The power supplies, as shown in FIG. 4, each include an inverter 220 receiving a DC link from rectifier 222. In accordance with Lincoln waveform technology, a chip or internal programmed pulse width modulator stage 224 is driven by an oscillator 226 at a frequency greater than 18 kHz and preferably greater than 20 kHz. As oscillator 226 drives pulse width modulator 224, the output current has a shape dictated by the wave shape outputted from wave shaper 240 as a voltage or digital numbers at line 242. The shape in real time is compared with the actual arc current in line 232 by a stage illustrated as comparator 230 so that the outputs on line 234 controls the shape of the AC waveforms. The digital number or voltage on line 234 determines the output signal on line 224*a* to control inverter 220 so that the waveform of the current at the arc follows the selected profile outputted from wave shaper 240. This is standard Lincoln waveform technology, as previously discussed. Power supply PS1 creates a DC arc at lead electrode 202; therefore, the output from wave shaper 240 of this power supply is a steady state indicating the magnitude of the DC current. The present invention does not relate to the formation of a DC arc. To the contrary, the present invention is the control of the current at two adjacent AC arcs for tandem electrodes, such as electrodes 204, 206. In accordance with the invention, wave shaper 240 involves an input 250 employed to select the desired shape or profile of the AC waveform. This shape can be shifted in real time by an internal programming schematically represented as shift program 252. Wave shaper 240 has an output which is a priority signal on line 254. In practice, the priority signal is a bit of logic, as shown in FIG. 12. Logic 1 indicates a negative polarity for the waveform generated by wave shaper 240 and logic 0 indicates a positive polarity. This logic signal or bit controller 220 directed to the power supply is read in accordance with the technology discussed in FIG. 12. The inverter switches from a positive polarity to a negative polarity, or the reverse, at a specific "READY" time initiated by a change of the logic bit on line 254. In practice, this bit is received from variable pulse generator 80 shown in FIG. 1 and in FIG. 5. This generator creates the timing of polarity changing signals. The welding system shown in FIGS. 3 and 4 is used in practicing the invention wherein the shape of AC arc currents at tandem electrodes 204 and 206 operated by phase shifted AC currents. The electric arc welding system shown in FIGS. 3 and 4 have a program to select the waveform at "SELECT" program 250 for wave shaper 240. In this manner the AC waveforms are used by the tandem electrodes. One of the power supplies to create an AC arc is schematically illustrated in FIG. 5. The power supply or source is synchronized by variable pulse generator 80, shown in FIG. 1. Signal 260 from the generator controls polarity shifts of the power supply for the first arc. This signal includes the synchronization of the waveform together with the polarity bit outputted by the wave shaper 240 on line 254. Lines 260*a*–260*n* control the polarity changing signals for the other tandem AC arcs operated by the welding system of the present invention. The pulses of these signals synchronize the other waveforms. FIG. 5 merely shows the relationship of pulse generator 80 to control the desired phase shift of successive arcs, as explained in connection with FIG. 4.

Figure 6:
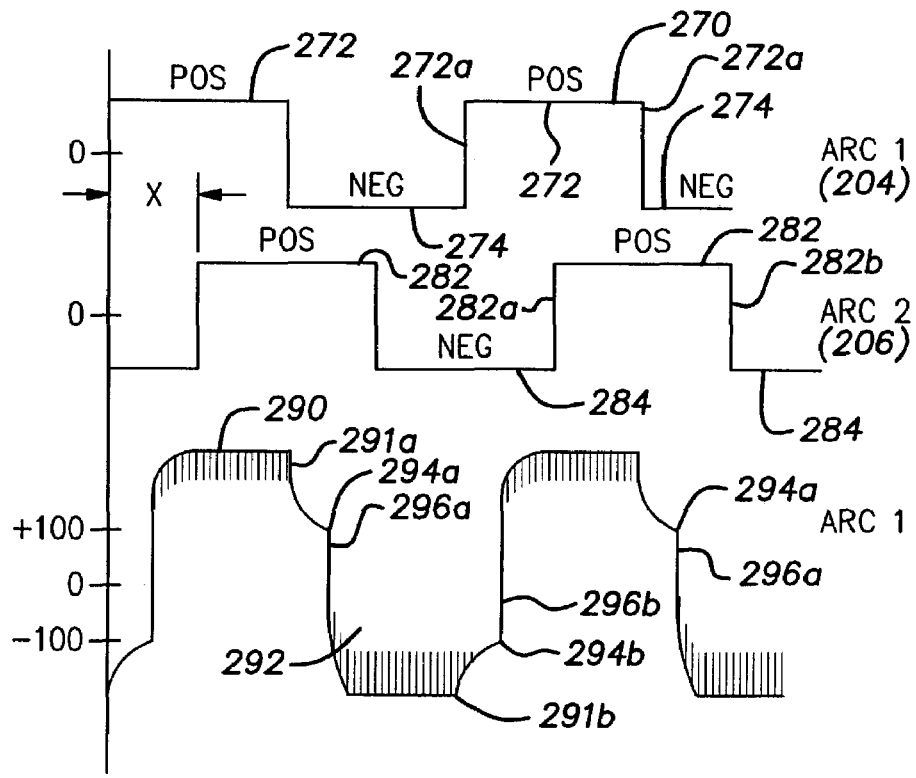
FIG. 6 is a current graph for one of two illustrated synchronizing pulses and showing a balanced AC waveform for one tandem electrode.

In the welding system of Houston U.S. Pat. No. 6,472,634, the AC waveforms are created as shown in FIG. 6 wherein the wave shaper for arc AC1 at electrode 204 creates a signal 270 having positive portions 272 and negative portions 274. Signal 270 is the pulse train from variable generator 80 shown in FIG. 1. The AC current on the first tandem electrode receives a polarity changing signal to shift into a positive polarity at leading edge 272*a* of positive portion 272. The leading edge generates a polarity changing signal. In a like manner, trailing edge 272*b* generates a polarity changing signal causing a command to shift the AC current to the negative polarity. Thus, the leading edge 272*a* and the trailing edge 272*b* create a polarity changing signal. This signal then initiates a polarity change command 502 shown in FIG. 12. The second arc AC2 at electrode 206 is controlled by signal 280 from the wave shaper having positive portions 282 and negative portions 284. Portion 282 has a leading edge 282*a* and a trailing edge 282*b*. These edges generate the polarity changing signals that control command signal 502 as previously described with respect to the signal 270. Polarity changing signals could be created by a timer, counter or internal computer program. However, in the preferred embodiment the polarity changing signals are, or are created by, the leading and trailing edges of the offset signals 270, 280 as shown in FIG. 6. These two signals are the same, but are shifted by the signal from generator 80 a distance x, as shown in FIG. 6. The waveform technology created current pulses or waveforms at one of the arcs are waveforms having positive portions 290 and negative portions 292 shown at the bottom portion of FIG. 6. A logic bit from the wave shaper is used as polarity changing signals to determine when the waveform is switched from the positive polarity to the negative polarity and the reverse. In accordance with the disclosure in Stava U.S. Pat. No. 6,111,216 (incorporated by reference herein) pulse width modulator 224 is generally shifted to a lower level at point 291*a* and 291*b*. Then the current reduces until reaching a fixed level, such as 100 amps. Consequently, the switches change polarity at points 294a and 294b. This produces a vertical line or shape 296a, 296b when current transitioning between positive portion 290 and negative portion 292. This is the system disclosed in the Houston patent where the like waveforms are shifted to avoid magnetic interference. The waveform portions 290, 292 are the same at arc AC1 and at arc AC2.

Figure 7:
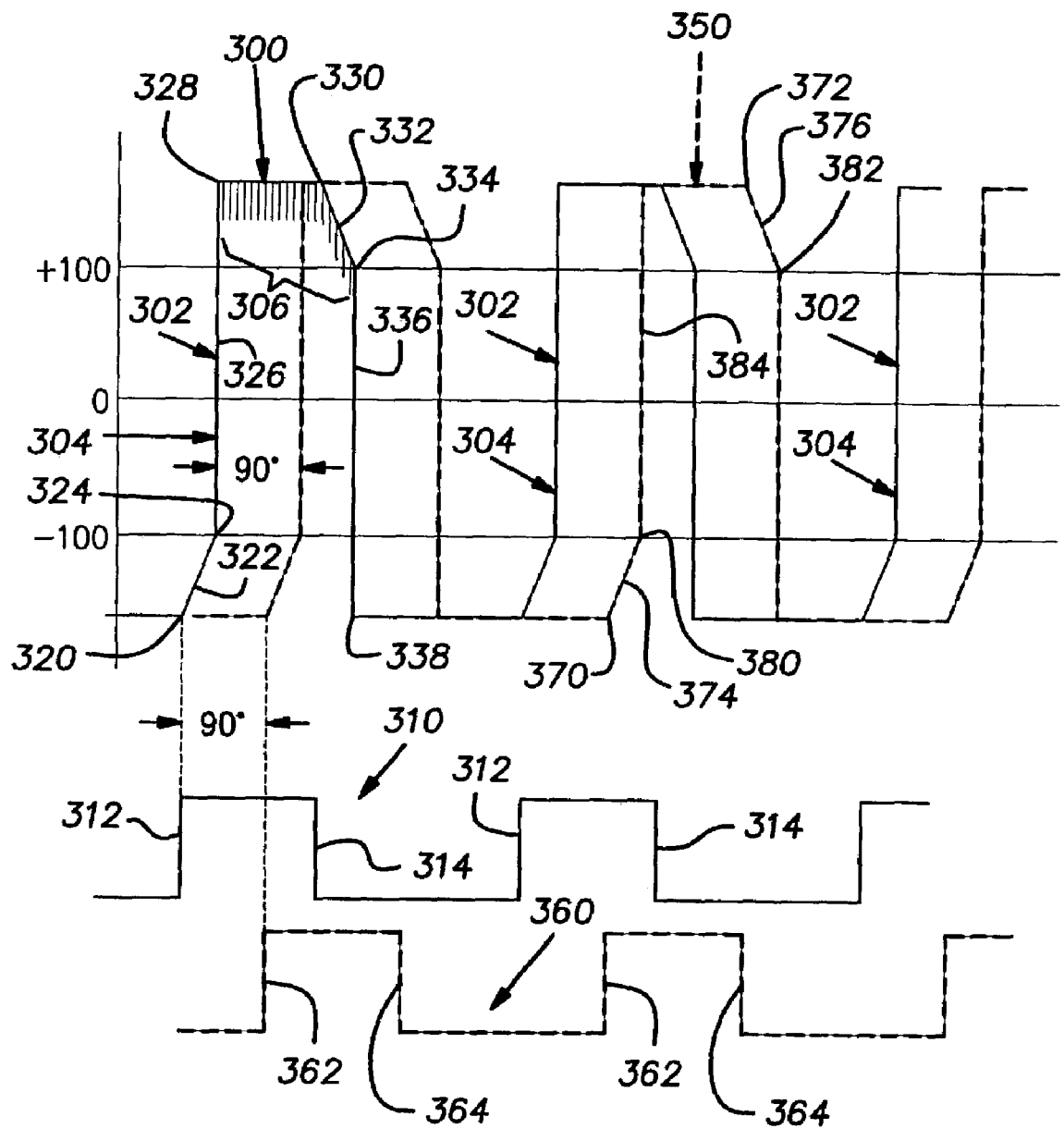
FIG. 7 is a pulse wave graph showing AC circuits at adjacent tandem electrodes with the synchronizing pulses of FIG. 6 that are used to change the polarity of the individual AC currents.

Using the technology so far described to power two adjacent tandem electrodes with phase shifted AC current is schematically illustrated in FIG. 7, wherein a first current 300 of one arc includes a positive pulse or portion 302 and a negative pulse or portion 304. In accordance with The Lincoln Electric waveform technology each pulse 302 and 304 is formed by a series of small current pulses schematically illustrated as pulses 306. A wave shaper or waveform generator controls the width of the pulses by a pulse width modulator controlling the duty cycle of small pulses 306. This determines the profile of the pulses. To control the polarity of current 300, pulse train 310 is created. This pulse train is the output of generator 80 or is initiated by single bit signals from the wave shaper. Pulse train 310 has a series of pulses each of which includes a leading edge 312 and a trailing edge 314. As illustrated, the leading edge 312 creates a polarity shifting signal for negative pulse 304 in the form of a command signal to change polarity. This command signal is shown as signal 502 in FIG. 12 where more than one power source is used. If there is only one power source, command signal 502 merely starts the switching process. The command signal is created by the polarity changing signal at point 320 of pulse 304. At point 320, the inverter of the power source is turned off, i.e. turned down, and current is increased along line 322 until the current is decreased, in a negative manner, from a peak of point 320 to point 324. At this point the current is at a set amount, i.e. a negative 100 amperes. Current 300 is then switched to positive along line 322 until it reaches a maximum or peak current 328 to define positive pulse or portion 302. The peak current is maintained until the trailing edge 314 of pulse train 310 appears or is generated. At this time, the trailing edge 314 defines or creates a polarity changing signal to generate a command signal at point 330 of pulse 302. The inverter is turned down and current decays along line 332 until it reaches the 100 ampere level 334. At this level, the polarity is changed along generally vertical line 336 causing current 300 to be at negative peak 338. This switching procedure repeats so current 300 alternates between positive pulse 302 and negative pulse 304 at a frequency determined by the time spacing between leading edge 312 and trailing edge 314. The shapes of the portions are determined by a wave shaper. The same procedure is used for current 350 shown in dashed lines in FIG. 7 and constituting the current at the second spaced tandem electrode. Control pulse train 360 comprises leading edges 362 and trailing edges 364 which are phase shifted 90° from the corresponding portions of pulse train 330. At leading edges 362, 364 command signals are created at points 370, 372 to initiate decay lines 374, 376 so that the second arc currents decay to points 380, 382, like points 324, 334 of current 300. In operation, changing polarity signals are created for each of the tandem arcs. These signals can be one bit caused by the leading and trailing edges of the pulse trains 310, 360 or otherwise generated. These polarity changing signals create a polarity changing command signal that initiates the polarity change of currents 300, 350. It is desirable that a preset phase shift be maintained between leading edges 312, 362 so that the current in the spaced tandem electrodes is always shifted a desired amount. This amount is normally 90° when the frequencies shown in FIG. 6 are 60 Hz.

Figure 8:
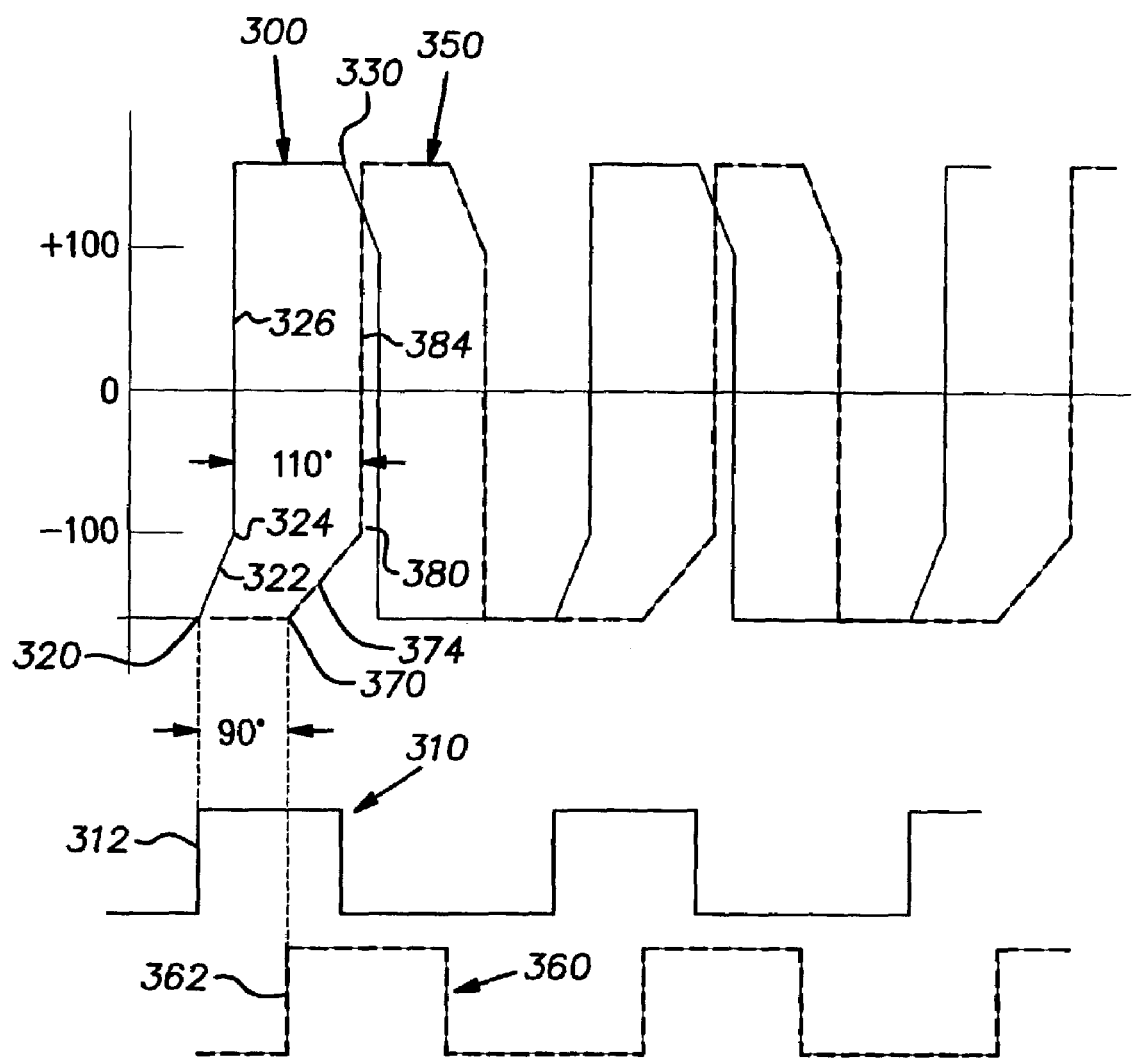
FIG. 8 is a view as shown in FIG. 7 illustrating an undesirable phase shift between adjacent AC currents with a short in arc 2.

As long as the electrodes are not shorted, the phase shift shown in FIG. 7 is maintained and the tandem electrodes operate efficiently to maintain a good sound weld bead. However, when one of the electrodes is shorted, the current after a polarity command requires a longer time to decrease. This is illustrated in FIG. 8 where a short occurs in the tandem electrode driven by AC current 350. Current 300 remains in the same position, as shown in FIG. 7. When negative pulse 304 is commanded to change polarity at point 370, the slope of line 374 is less so point 380 is reached after a longer time. When this occurs, vertical switching line 384 is moved away from vertical switching line 226, as shown in FIG. 8. The lines 322, 374 are based upon a time constant which is proportional to the inductance divided by the resistance. As the resistance decreases during a short, the time constant increases an amount generally in the range of 1–2 ms. This delay of current 350 has been experienced in all systems due to the inherent inductive nature of the system. It has been found that the line frequency, inductive circuit and added time for point 380 will produce an additional phase shift of approximately 21% at 60 Hz. This additional phase shift causes the tailing arc to shift up to 110°, as shown in FIG. 8. Such additional phase shift of current 350 with respect to current 300 causes arc blows and affect weld puddle stability sought by the fixed phase shift between pulse train 310, 360.

Figure 9:
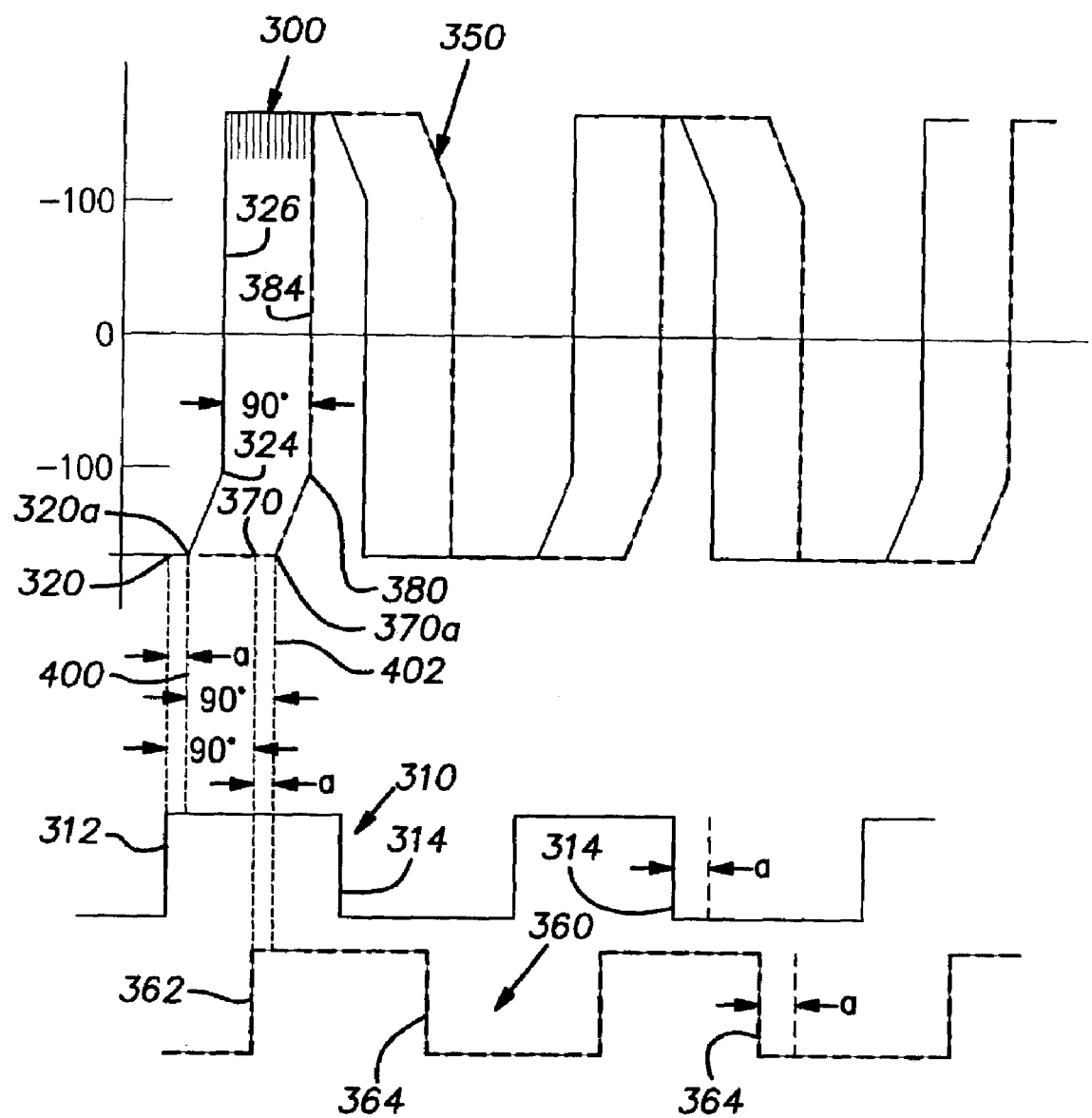
FIG. 9 is a view like FIG. 7 using the circuit or program elements of FIG. 9 with neither of adjacent electrodes shorted.
Figure 10:
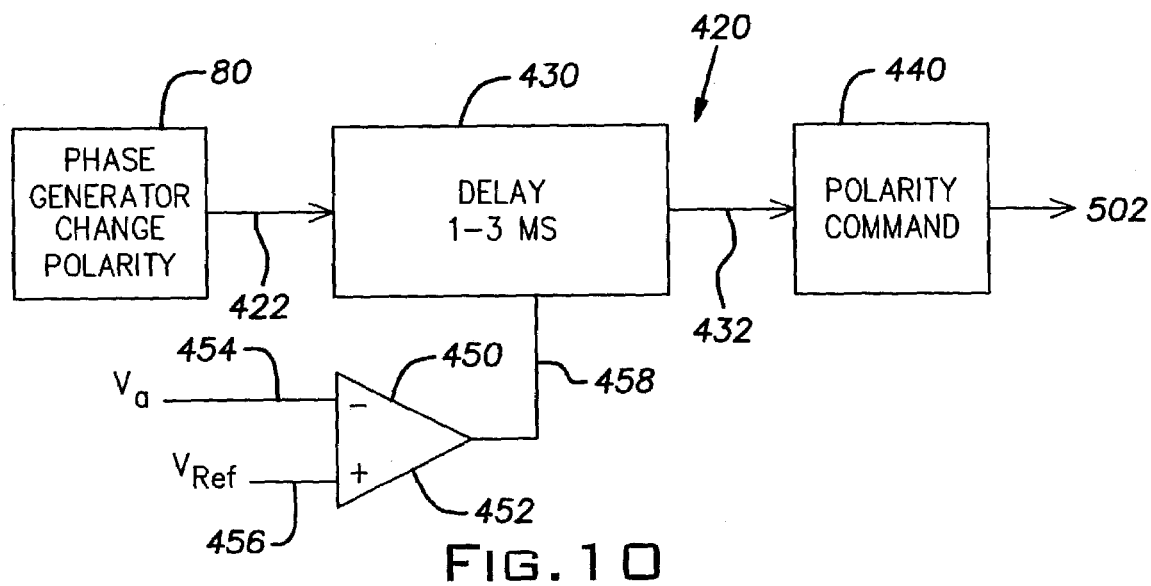
FIG. 10 is a diagram of a circuit or computer program element of the present invention used to overcome the disadvantage represented in the illustration of FIG. 8.
Figure 11:
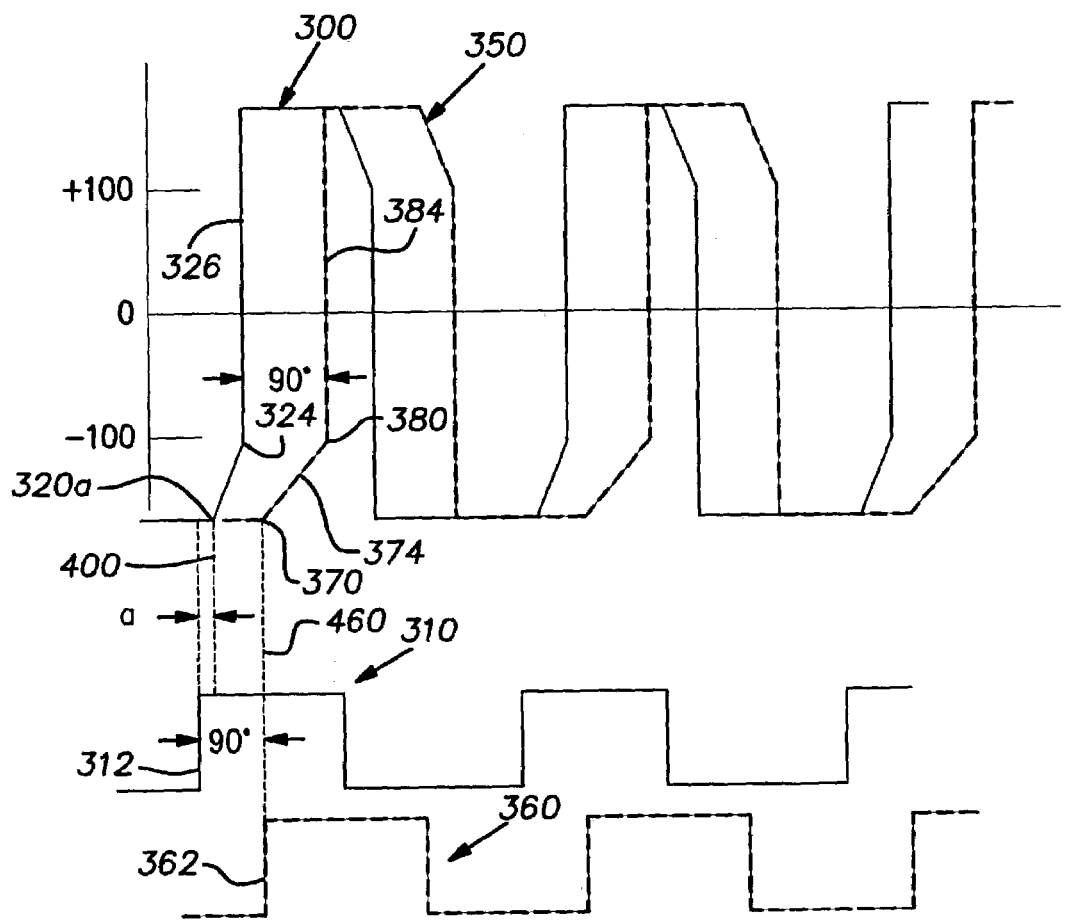
FIG. 11 is a view as shown in FIG. 9 using the circuit or program elements of FIG. 10 in accordance with the present invention with one of the adjacent tandem electrodes shorted; and, FIG. 12 is a schematic layout of the software program to cause switching of the paralleled power supplies as soon as the coordinated switch commands have been processed and the next coincident signal has been created.

The undesired detrimental phase shift caused by a short as represented in FIG. 8 is overcome by the present invention. In accordance with an aspect of the present invention, as illustrated in FIG. 9, leading edge 312 creates a polarity changing signal in accordance with standard technology. In accordance with the invention, command signal 502 is delayed an amount a. Consequently, the command signal is created by the polarity changing signal at a later time as indicated by line 400. Thus, command point 320 is shifted a distance a to a new or delayed command point 320a. In a like manner, the leading edge 362 controlling current 350 is delayed by time a so the command signal is given at point 370a. This is at a time delay represented by time 402, shown in FIG. 9. The command signal is shifted from point 370 to point 370a. The same delay is created for trailing edges 314, 364 although they can be shifted differently. The delay is caused by a circuit in the digital signal processor or microprocessor of the welder. This delay is shown in FIG. 9. Currents 300, 350 are essentially the same as shown in FIG. 7. In accordance with the invention a delay circuit operated by the microprocessor causes delays 400, 402 and similar delays at trailing edges 314, 364. These delays have no effect on the operation of the welder as long as there is no short at either tandem electrode. In accordance with the invention, the delay is controlled by a system schematically illustrated as system 420 shown in FIG. 10. Phase shift generator 80 produces change polarity signals in line 422 at the input of digital delay circuit 430. This circuit is adjusted to cause a signal delay in the general range of 1–3 ms. The polarity changing signal in line 422 is the leading or trailing edge of pulse trains 310, 360, a single bit data created by the leading edge or trailing edge or another appropriately developed signals used to control the phase of currents 300, 350 by coordinating changes in polarity. The signal in line 422 is delayed by circuit 430 to produce a delayed signal in line 432. This delayed signal is directed to the polarity command circuit 440 to create polarity change command 502 shown in FIG. 12. So far the operation of digital system 420 produces the results as shown in FIG. 9. However, the system also includes a short circuit detector circuit 450 to detect a rapid decrease in arc voltage. This circuit is digitally constructed and detects a short. System 420 is schematically represented as a comparator 452 for comparing the sensed arc voltage on line 454 with a reference voltage on line 456. When the voltage at the arc decreases below the reference voltage, a signal is directed to delay circuit 430 by line 458. This deactivates delay circuit 430 so a polarity changing signal in line 422 produces a no delayed signal in line 432 to create a command for changing the polarity of the current. If there is a short, as represented in FIG. 8, the present invention disclosed in FIGS. 9 and 10 causes currents 300, 350 to remain in essentially the proper phase relationship. This operation is illustrated in FIG. 11. The command point of current 300 remains the delayed point 320a. However, short of the electrode using current 350, causes delay circuit 430 to be deactivated by the logic in line 458. Consequently, the command signal for current 350 of the shorted electrode remains at point 370. There is no delay. Thus, the negative current decreases along line 374 causing point 380 to be reached at essentially the same time as it is in FIGS. 7 and 9. By intentionally employing a circuit to cause a delay between the polarity changing signal and the polarity changing command, it is possible to deactivate the delay when there is a short. The current at the shorted electrode will shift to the left and remain essentially in the proper phase relationship with the other current. This invention maintains the proper puddle dynamics and relationship between currents flowing through tandem electrodes. The circuits of system 420 represented in FIG. 10 are digitally implemented in the preferred embodiment of the invention. The polarity changing signals are signals occurring at preset times. They can be created as counter pulses, digital pulses and detected leading or trailing edges as in the preferred embodiment. These are all equal implementations and are equivalent. The polarity changing signals activate a delay circuit which is deactivated or reduced in time in accordance with the present invention when a short is detected.

The implementation of the switching for all power supplies for a single AC arc uses the switching technique where actual switching can occur only after all power supplies are below the given low current level. This process is accomplished in the software of the digital processor and is illustrated by the schematic layout of FIG. 10. When the controller of master power supply 500 receives a polarity changing command signal as represented by line 502, the power supply starts the switching sequence. The master outputs a logic on line 504 to provide the desired polarity for switching of the slaves to correspond with polarity switching of the master. In the commanded switch sequence, the inverter of master power supply 500 is turned off or down so current to electrode E is decreased as read by hall effect transducer 510. The switch command in line 502 causes an immediate "kill" signal as represented by line 512 to the controllers of paralleled slave power supplies 520, 522 providing current to junction 530 as measured by hall effect transducers 532, 534. All power supplies are in the switch sequence with inverters turned off or down. Software comparator circuits 550, 552, 554 compare the decreased current to a given low current referenced by the voltage on line 556. As each power supply decreases below the given value, a signal appears in lines 560, 562, and 564 to the input of a sample and hold circuits 570, 572, and 574, respectively. The circuits are outputted by a strobe signal in line 580 from each of the power supplies. When a set logic is stored in a circuit 570, 572, and 574, a YES logic appears on lines READY[1], READY[2], and READY[3] at the time of the strobe signal. This signal is generated in the power supplies and has a period of 25 μs; however, other high speed strobes could be used. The signals are directed to controller C of the master power supply, shown in dashed lines in FIG. 10. A software ANDing function represented by AND gate 580 has a YES logic output on line 582 when all power supplies are ready to switch polarity. This output condition is directed to clock enable terminal ECLK of software flip flop 600 having its D terminal provided with the desired logic of the polarity to be switched as appearing on line 504. An oscillator or timer operated at about 1 MHz clocks flip flop by a signal on line 602 to terminal CK. This transfers the polarity command logic on line 504 to a Q terminal 604 to provide this logic in line 610 to switch slaves 520, 522 at the same time the identical logic on line 612 switches master power supply 500. After switching, the polarity logic on line 504 shifts to the opposite polarity while master power supply awaits the next switch command based upon the switching frequency.

Having thus defined the invention, the following is claimed:

1. An electric arc welding apparatus comprising at least a first consumable electrode and a second consumable electrode movable in unison along a welding path on a workpiece, a first power source for passing a first current with alternate positive and negative pulses between said first electrode and said workpiece, a second power source for passing a second current with alternate positive and negative pulses between said second electrode and said workpiece, a first circuit to generate a first series of polarity changing signals for said first current, a second circuit to generate a second series of polarity changing signals for said second current, a circuit to create a polarity changing command signal in response to each of said polarity changing signals, each of said command signals using a change in polarity only when said current commanded to change polarity decreases to a set value, and a circuit to delay creation of one of said polarity changing command signals after generation of the polarity changing signal that caused said delayed command signal.

2. An apparatus as defined in claim 1 wherein said delay is in the general range of 1–3 ms.

3. An apparatus as defined in claim 2 including a circuit to generate a first train of pulses, with leading and trailing edges of said pulses defining said polarity changing signals for said first current and circuit to generate a second train of pulses with the leading and trailing edges of said pulses defining said polarity changing signals for said second current.

4. An apparatus as defined in claim 3 wherein said first series of polarity changing signals is offset a given amount from said second series of polarity changing signals.

5. An apparatus as defined in claim 4 wherein said offset amount is about 90° based upon a 60 Hz welding current.

6. An apparatus as defined in claim 4 including a first detector circuit to detect a short in said first current and a circuit to deactivate said delay circuit for a subsequent pulse in said first current upon detection of said short in said first current.

7. An apparatus as defined in claim 6 including a second detect circuit to detect a short in said second current and a circuit to deactivate said delay circuit for a subsequent pulse in said second current upon detection of said short in said second current.

8. An apparatus as defined in claim 3 including a first detector circuit to detect a short in said first current and a circuit to deactivate said delay circuit for a subsequent pulse in said first current upon detection of said short in said first current.

9. An apparatus as defined in claim 8 including a second detect circuit to detect a short in said second current and a circuit to deactivate said delay circuit for a subsequent pulse in said second current upon detection of said short in said second current.

10. An apparatus as defined in claim 2 wherein said first series of polarity changing signals is offset a given amount from said second series of polarity changing signals.

11. An apparatus as defined in claim 10 wherein said offset amount is about 90° based upon a 60 Hz welding current.

12. An apparatus as defined in claim 10 including a first detector circuit to detect a short in said first current and a circuit to deactivate said delay circuit for a subsequent pulse in said first current upon detection of said short in said first current.

13. An apparatus as defined in claim 12 including a second detect circuit to detect a short in said second current and a circuit to deactivate said delay circuit for a subsequent pulse in said second current upon detection of said short in said second current.

14. An apparatus as defined in claim 2 including a first detector circuit to detect a short in said first current and a circuit to deactivate said delay circuit for a subsequent pulse in said first current upon detection of said short in said first current.

15. An apparatus as defined in claim 14 including a second detect circuit to detect a short in said second current and a circuit to deactivate said delay circuit for a subsequent pulse in said second current upon detection of said short in said second current.

16. An apparatus as defined in claim 2 wherein both said first and second currents are formed by a large number of small individual current pulses from a pulse width modulator and having a profile controlled by a wave shaper.

17. An apparatus as defined in claim 1 including a circuit to generate a first train of pulses, with leading and trailing edges of said pulses defining said polarity changing signals for said first current and circuit to generate a second train of pulses with the leading and trailing edges of said pulses defining said polarity changing signals for said second current.

18. An apparatus as defined in claim 17 wherein said first series of polarity changing signals is offset a given amount from said second series of polarity changing signals.

19. An apparatus as defined in claim 18 wherein said offset amount is about 90° based upon a 60 Hz welding current.

20. An apparatus as defined in claim 18 including a first detector circuit to detect a short in said first current and a circuit to deactivate said delay circuit for a subsequent pulse in said first current upon detection of said short in said first current.

21. An apparatus as defined in claim 20 including a second detect circuit to detect a short in said second current and a circuit to deactivate said delay circuit for a subsequent pulse in said second current upon detection of said short in said second current.

22. An apparatus as defined in claim 17 wherein both said first and second currents are formed by a large number of small individual current pulses from a pulse width modulator and having a profile controlled by a wave shaper.

23. An apparatus as defined in claim 1 wherein said first series of polarity changing signals is offset a given amount from said second series of polarity changing signals.

24. An apparatus as defined in claim 23 wherein said offset amount is about 90° based upon a 60 Hz welding current.

25. An apparatus as defined in claim 23 including a first detector circuit to detect a short in said first current and a circuit to deactivate said delay circuit for a subsequent pulse in said first current upon detection of said short in said first current.

26. An apparatus as defined in claim 25 including a second detect circuit to detect a short in said second current and a circuit to deactivate said delay circuit for a subsequent pulse in said second current upon detection of said short in said second current.

27. An apparatus as defined in claim 26 wherein said subsequent pulse is a next pulse in said current.

28. An apparatus as defined in claim 25 wherein said subsequent pulse is a next pulse in said current.

29. An apparatus as defined in claim 23 including a first detector circuit to detect a short in said first current and a circuit to deactivate said delay circuit for a subsequent pulse in said first current upon detection of said short in said first current.

30. An apparatus as defined in claim 29 including a second detect circuit to detect a short in said second current and a circuit to deactivate said delay circuit for a subsequent pulse in said second current upon detection of said short in said second current.

31. An apparatus as defined in claim 23 wherein both said first and second currents are formed by a large number of small individual current pulses from a pulse width modulator and having a profile controlled by a wave shaper.

32. An apparatus as defined in claim 1 including a first detector circuit to detect a short in said first current and a circuit to deactivate said delay circuit for a subsequent pulse in said first current upon detection of said short in said first current.

33. An apparatus as defined in claim 32 including a second detect circuit to detect a short in said second current and a circuit to deactivate said delay circuit for a subsequent pulse in said second current upon detection of said short in said second current.

34. An apparatus as defined in claim 32 wherein both said first and second currents are formed by a large number of small individual current pulses from a pulse width modulator and having a profile controlled by a wave shaper.

35. An apparatus as defined in claim 1 wherein both said first and second currents are formed by a large number of small individual current pulses from a pulse width modulator and having a profile controlled by a wave shaper.

36. An electric arc welding apparatus comprising at least a first consumable electrode and a second consumable electrode movable in unison along a welding path on a workpiece, a first power source for passing a first current with alternate positive and negative pulses between said first electrode and said workpiece, a second power source for passing a second current with alternate positive and negative pulses between said second electrode and said workpiece, a circuit to generate a first series of polarity changing signals for each pulse in said first current, a second circuit to generate a second series of polarity changing signals for each pulse in said second current, a first delay circuit for delaying the change in polarity of a pulse in said first current after generation of polarity changing signals for said first current, said delay being for a given time and a circuit to deactivate said first delay circuit upon a short in said first current for at least a subsequent pulse.

37. An apparatus as defined in claim 36 wherein said given time of said delay circuit is less than 3 ms.

38. An apparatus as defined in claim 36 wherein said deactivation of said first delay circuit is by reducing said given time.

39. An apparatus as defined in claim 36 including a second delay circuit for delaying the change in polarity of a pulse in said second current after generation of a polarity changing signal for said second current and a circuit to deactivate said second delay circuit upon a short in said second current.

40. An apparatus as defined in claim 39 wherein both said first and second currents are formed by a large number of small individual current pulses from a pulse width modulator and having a profile controlled by a wave shaper.

41. An apparatus as defined in claim 36 wherein both said first and second currents are formed by a large number of small individual current pulses from a pulse width modulator and having a profile controlled by a wave shaper.

42. A method of changing polarity of the welding current in an electric arc welder, said method comprising:
   (a) generating a polarity changing signal;
   (b) commanding a change in the polarity of said current a given time after generation of said polarity changing signal; and,
   (c) reducing said given time upon detection of a short in said welding current.

43. A method as defined in claim 42 wherein said given time is less than 3 ms.

44. A method as defined in claim 43 wherein said given time is reduced to about zero.

45. A method as defined in claim 44 wherein said polarity is changed when said current decreases to a given value after being commanded to change.

46. A method as defined in claim 43 wherein said polarity is changed when said current decreases to a given value after being commanded to change.

47. A method as defined in claim 42 wherein said given time is reduced to about zero.

48. A method as defined in claim 47 wherein said polarity is changed when said current decreases to a given value after being commanded to change.

49. A method as defined in claim 42 wherein said polarity is changed when said current decreases to a given value after being commanded to change.

50. A method as defined in claim 42 wherein said welding current is formed by a large number of small individual current pulses from a pulse width modulator and having a profile controlled by a wave shaper.

51. A system to change polarity of the welding current in an electric arc welder, said system comprising: a first circuit to generate a polarity changing signal; a second circuit to command a change in the polarity for said current a given time after generation of said polarity changing signal; and, a circuit to reduce said given time upon detection of a short in said welding current.

52. A system as defined in claim 51 wherein said given time is less than 3 ms.

53. A system as defined in claim 52 wherein said given time is reduced to about zero.

54. A system as defined in claim 53 wherein said polarity is changed when said current decreases to a given value after being commanded to change.

55. A system as defined in claim 53 wherein said polarity is changed when said current decreases to a given value after being commanded to change.

56. A system as defined in claim 52 wherein said polarity is changed when said current decreases to a given value after being commanded to change.

57. A system as defined in claim 51 wherein said given time is reduced to about zero.

58. A system as defined in claim 57 wherein said polarity is changed when said current decreases to a given value after being commanded to change.

59. A system as defined in claim 51 wherein said polarity is changed when said current decreases to a given value after being commanded to change.

60. A system as defined in claim 59 wherein said welding current is formed by a large number of small individual current pulses from a pulse width modulator and having a profile controlled by a wave shaper.

61. A system as defined in claim 51 wherein said welding current is formed by a large number of small individual current pulses from a pulse width modulator and having a profile controlled by a wave shaper.

* * * * *